US012692054B2

(12) United States Patent
Derfus et al.

(10) Patent No.: US 12,692,054 B2

(45) Date of Patent: Jul. 28, 2026

(54) CONTAINER CLOSURE INDICATOR SYSTEM

(71) Applicant: Abbott Rapid Diagnostics International Unlimited Company, Dublin (IE)

(72) Inventors: Austin M. Derfus, Solana Beach, CA (US); Adrian P. Crute, Escondido, CA (US); Armando R. Tovar, San Diego, CA (US); Brian Cattaneo, Carlsbad, CA (US)

(73) Assignee: Abbott Rapid Diagnostics International Unlimited Company, Dublin (IE)

(*) Notice: Subject to any disclaimer, the term of this patent is extended or adjusted under 35 U.S.C. 154(b) by 0 days.

(21) Appl. No.: 18/833,806

(22) PCT Filed: Jan. 27, 2023

(86) PCT No.: PCT/US2023/011771
§ 371 (c)(1),
(2) Date: Jul. 26, 2024

(87) PCT Pub. No.: WO2023/147076
PCT Pub. Date: Aug. 3, 2023

(65) Prior Publication Data

US 2025/0145350 A1 May 8, 2025

Related U.S. Application Data

(60) Provisional application No. 63/304,508, filed on Jan. 28, 2022.

(51) Int. Cl.
*B67B 3/00* (2006.01)
*B01L 3/00* (2006.01)
(Continued)

(52) U.S. Cl.
CPC ........ *B65D 51/248* (2013.01); *B01L 3/50825* (2013.01); *B01L 2200/145* (2013.01);
(Continued)

(58) Field of Classification Search
CPC .................. A61J 3/074; B01L 3/50825; B01L 2200/145; B01L 2200/042;
(Continued)

(56) References Cited

U.S. PATENT DOCUMENTS 3,218,463 A * 11/1965 Calhoun .............. G01N 21/909 250/223 B
3,469,689 A * 9/1969 O'Neill, Jr. ............. B07C 5/128 209/570

(Continued)

FOREIGN PATENT DOCUMENTS

CN 103261047 8/2013
EP 1660383 7/2008

(Continued)

*Primary Examiner* — Gideon R Weinerth

(74) *Attorney, Agent, or Firm* — Edward J. Baba; Mandar A. Joshi; Bozicevic, Field & Francis LLP

(57) ABSTRACT

Aspects of the present disclosure include a container closure indicator system for indicating that a cap is completely engaged with a container and method for using the same. The system may include a cap flag and a flag screen. The cap flag may be located on a lower surface of a cap and may extend downwards away from the lower surface. The flag screen may be located on an outer surface of a container adjacent a top end of the container and extends towards a bottom end of the container. The cap flag may be configured for insertion behind the flag screen when the cap is lowered towards the top end of the container. The flag screen may be configured to occlude visibility of the cap flag till the cap is fully engaged with the container. Appearance of the cap flag behind the flag screen indicates that the container is closed by the cap. Appearance of the cap flag behind the flag screen
(Continued)

may be visualized by a user or automatically by a camera. The camera may relay information regarding closing of the container to an instrument in which the container has been placed.

17 Claims, 15 Drawing Sheets

(51) Int. Cl.
*B65D 41/04* (2006.01)
*B65D 51/24* (2006.01)
*B67B 3/26* (2006.01)

(52) U.S. Cl.
CPC ... *B01L 2300/042* (2013.01); *B01L 2300/046* (2013.01); *B67B 3/264* (2013.01)

(58) Field of Classification Search
CPC ..... B01L 2200/046; B65B 3/003; B65B 7/28; B65B 55/027; B67B 3/00; B65D 79/02; B65D 25/54; B65D 2201/00; B65G 2201/0244; B65G 2203/0225; B65G 2203/041; G01M 3/00; G01M 3/36; G01N 21/909; G01N 21/90; G01N 21/88; G01N 21/9054; G01N 21/9081; G01N 21/8806; G01N 35/00
USPC ........................................................ 206/459.1
See application file for complete search history.

(56) References Cited

U.S. PATENT DOCUMENTS 4,606,635 A * 8/1986 Miyazawa ......... G01N 21/9054 356/240.1
5,356,017 A 10/1994 Rohr et al.
5,369,713 A * 11/1994 Schwartz ........... G01N 21/9081 356/240.1
6,237,418 B1 * 5/2001 Coughlin .................. B67B 3/26 209/524
6,654,117 B1 * 11/2003 Reading .................. B67B 3/264 356/240.1
6,772,902 B1 8/2004 White
8,807,359 B2 * 8/2014 Giraud ............... B65D 47/0804 220/283
9,569,833 B2 * 2/2017 Heuft ....................... B67B 3/261
2001/0048759 A1 * 12/2001 Hiramoto .............. G06T 7/0002 382/141
2002/0097396 A1 * 7/2002 Schafer ...................... B07C 5/10 356/240.1
2004/0042004 A1 * 3/2004 Lindner ............. G01N 21/9054 356/240.1
2005/0133396 A1 * 6/2005 Daykin ............... B01L 3/50825 206/459.1
2006/0000833 A1 1/2006 Boots et al.
2008/0131949 A1 6/2008 Bortolin et al.
2008/0259329 A1 10/2008 Schlieper et al.
2011/0114591 A1 5/2011 Giraud et al.
2012/0211493 A1 * 8/2012 Daggett ................. B65D 43/22 206/508
2013/0068649 A1 * 3/2013 Chen ................... B01L 3/50825 206/459.1
2014/0127790 A1 5/2014 Malik et al.
2014/0231376 A1 * 8/2014 Antier .................... B65D 41/04 215/44
2015/0010229 A1 * 1/2015 Heuft ...................... B67B 3/261 382/142
2015/0211958 A1 * 7/2015 Bruecklmeier ........ G01B 11/14 356/138
2018/0172603 A1 * 6/2018 Piana ...................... B67B 3/261
2018/0356259 A1 * 12/2018 Baeumlisberger ..... G01N 35/00
2019/0046972 A1 2/2019 Mulakkapurath et al.
2019/0270086 A1 9/2019 Harding et al.
2019/0338346 A1 11/2019 Connolly et al.
2021/0025831 A1 * 1/2021 Shih ....................... G01N 21/90
2021/0131895 A1 * 5/2021 Forestelli ................ G06T 7/001
2021/0253310 A1 8/2021 Wong et al.
2024/0201101 A1 * 6/2024 Piana ..................... G01N 21/90
2024/0308833 A1 * 9/2024 Niedermeier ......... G06T 1/0014
2024/0370988 A1 * 11/2024 Niedermeier ........... B67B 3/264
2025/0058946 A1 * 2/2025 Remer ................. B65D 51/248
2025/0173853 A1 * 5/2025 Kwoka .............. G01N 21/8806

FOREIGN PATENT DOCUMENTS

GB 2107290 4/1983
WO 2021138210 7/2021
WO 2022165222 8/2022
WO 2022165225 8/2022
WO 2022165257 8/2022

* cited by examiner

200

200

CONTAINER CLOSURE INDICATOR SYSTEM

CROSS-REFERENCE TO RELATED APPLICATIONS

This application claims priority benefit to U.S. Provisional Application Ser. No. 63/304,508, filed on Jan. 28, 2022, the disclosure of which application is herein incorporated by reference in its entirety.

INTRODUCTION

Containers can be provided in open or partially open configuration to allow users access to the interior of the containers, for, e.g., adding material(s) to the interior of a container prior to closing the container.

A user is tasked to ensure that a container is completely closed. However, incomplete or improper closure can occur, leading to spillage of material present in the container.

Ensuring complete closure of containers is especially important when the container includes biological materials that may be infectious, or other hazardous material, such as, corrosive chemicals, skin or eye irritants, and the like. In some cases, the container may be a cartridge used for automatic or semi-automatic sample preparation. In such cases, it may be desirable to have an automatic or a semi-automatic system for indicating that the cartridge is completely closed with a cap after a biological sample has been introduced to a chamber of the cartridge and prior to processing of the biological sample for, e.g., isolating a target analyte present in the biological sample.

There is an interest in means suitable for indicating container closure that ensures that a container is completely closed thereby reducing user error, spread of hazardous materials, etc.

SUMMARY

Aspects of the present disclosure include a container closure indicator system for indicating that a cap is completely engaged with a container. The system may include a cap flag and a flag screen. The cap may include an upper surface opposite a lower surface. The cap flag may be located on the lower surface of a cap and may extend downwards away from the lower surface. The flag screen may be located on an outer surface of a container sized to be closed by the cap. The flag screen may be located adjacent a top end of the container and may extend towards a bottom end of the container. The cap flag may be configured for insertion behind the flag screen when the cap is lowered towards the top end of the container. The flag screen may be configured to occlude visibility of the cap flag, when viewed from the front, till the cap is fully engaged with the container. Appearance of the cap flag behind the flag screen, when viewed from the front, indicates that the container is closed by the cap. The term "front" refers to a view from an exterior location relative to the container. The view may be from an exterior location which location is substantially perpendicular to the surfaces of the cap flag and flag screen such that the front of the cap flag and flag screens are being visualized, as opposed to a side view, a top view or a bottom view. Thus, front is relative to the point of observation of the flag screen and cap flag regardless of whether the container itself has designated front and rear regions based upon, e.g., use of the container. In other words, the front view refers to the view of the flag screen and cap flag from an exterior point of observation, which exterior point is location substantially perpendicular to the flag screen and cap flag. The cap flag and flag screen may be located in a front region or a rear region of the container.

Appearance of the cap flag behind the flag screen may be visualized by a user or by a camera. The camera may relay information regarding closing of the container to an instrument. The instrument may be an instrument in which the container has been placed. The instrument may be programmed to start processing the container upon receipt of indication that the container is closed.

Methods for indicating closure of a container with a cap are also provided. The methods may be computer-implemented methods, e.g., performed by a processor configured to execute instructions stored on and/or provided by a memory coupled to the processor.

BRIEF DESCRIPTION OF THE FIGURES

FIGS. 4A and 4C depict a front-view of the system as captured by a camera. FIG. 4B shows an angled side-view of the system, illustrating the cap flag and flag screen and cone of view of the camera. FIG. 4D shows a top view of the system.

DETAILED DESCRIPTION

Figure 1A:
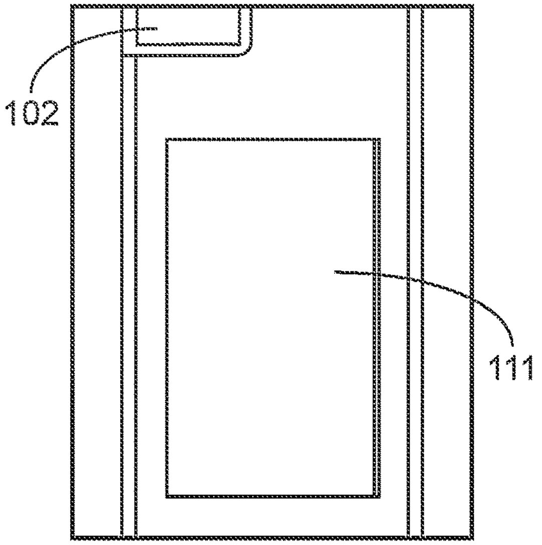
FIGS. 1A-1D show images of a container closure indicator system that includes a camera. A front view of the system as viewed by the camera is shown.

Aspects of the present disclosure include a container closure indicator system for indicating that a cap is completely engaged with a container. The system may include a cap flag and a flag screen. The cap may include an upper surface opposite a lower surface. The cap flag may be located on the lower surface of a cap and may extend downwards away from the lower surface. The flag screen may be located on an outer surface of a container sized to be closed by the cap. The flag screen may be located adjacent a top end of the container and may extend towards a bottom end of the container. The cap flag may be configured for insertion behind the flag screen when the cap is lowered towards the top end of the container. The flag screen may be configured to occlude visibility of the cap flag, when viewed from a point in front of the flag screen, till the cap is fully engaged with the container. Appearance of the cap flag behind the flag screen, when viewed from the front, indicates that the container is closed by the cap. Appearance of the cap flag behind the flag screen may be visualized by a user or by a camera. The camera may relay information regarding closing of the container to an instrument. The instrument may be an instrument in which the container has been placed. The instrument may be programmed to start processing the container upon receipt of indication that the container is closed. Also provided herein are methods for detecting closure of a container. In certain embodiments, the method utilizes a camera for an semi-automated or an automated detection of complete closure of a container. In certain embodiments, the method comprises a computer-implemented method for detecting closure of a container.

Before the present systems, sample preparation devices and methods are described in greater detail, it is to be understood that the present disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the present systems, sample preparation devices and methods. The upper and lower limits of these smaller ranges may independently be included in the smaller ranges and are also encompassed within the systems, sample preparation devices and methods, subject to any specifically excluded limit in the stated range. Where the stated range includes one or both of the limits, ranges excluding either or both of those included limits are also included in the systems, sample preparation devices and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present systems, sample preparation devices and methods, representative illustrative systems, sample preparation devices and methods are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present sample preparation cartridges, methods, and sample preparation units. Any recited method can be carried out in the order of events recited or in any other order which is logically possible.

Systems for Indicating Complete Closing of Container

Aspects of the present disclosure include a container closure indicator system for indicating that a cap is completely engaged with a container. The system may include a cap flag and a flag screen. The cap may include an upper surface opposite a lower surface. The cap flag may be located on the lower surface of a cap and may extend downwards away from the lower surface. The flag screen may be located on an outer surface of a container sized to be closed by the cap. The flag screen may be located adjacent a top end of the container and may extend towards a bottom end of the container. The cap flag may be configured for insertion behind the flag screen when the cap is lowered towards the top end of the container. The flag screen may be configured to occlude visibility of the cap flag, when viewed from a point substantially in front of the flag screen and exterior to the container, till the cap is fully engaged with the container. Appearance of the cap flag behind the flag screen, when viewed from substantially the front, indicates that the container is closed by the cap. Appearance of the cap flag behind the flag screen may be visualized by a user or by a camera. The camera may relay information regarding closing of the container to an instrument. The instrument may be an instrument in which the container has been placed. The instrument may be programmed to start processing the container upon receipt of indication that the container is closed.

As used herein, the term "fully engaged" in the context of a cap and a container refers to complete closing of the container by the cap such that the container is fluidically sealed by the cap. By "fluidically sealed" it is meant that fluids present in the interior of the container cannot readily flow out from an opening of the container that has been sealed by the cap. In certain embodiments, the term "fully engaged" can also encompass a configuration in which the cap is in locked position such that the cap cannot be easily opened, such as, by applying upward pressure on the cap or by applying twisting pressure to force apart the cap and the container. Such a locked position can aid in preventing reuse of the container, e.g., for single-use containers.

As used herein, the term "distal end" refers to the end located further away from a reference point as compared to a proximal end which is located closer to the reference point. The terms "horizontal" and "vertical" are used to indicate direction relative to an absolute reference, e.g., ground level. However, these terms should not be construed to require structures to be absolutely parallel or absolutely perpendicular to each other. For example, a first vertical structure and a second vertical structure are not necessarily parallel to each other. The terms "top" and "bottom" or "upper" or "lower" are used to refer to surfaces where the top is always higher than the bottom relative to an absolute reference, e.g., the surface of the earth. The terms "upwards" and "downwards" are also relative to an absolute reference; upwards is always against the gravity of the earth while downwards is always towards the gravity of the earth.

The cap can include a lower surface and an upper surface. The cap can be of any suitable shape. The cap can have a shape that generally matches that of the top end of the container. The cap can have a size bigger that the top end of the container such that the cap can enclose the top end. The cap can have a size smaller that the top end of the container such the cap can fit inside the top end. In some cases, both the cap and the top end of the container can be circular, rectangular, oval, or may have an irregular shape.

The cap flag may include a first region proximal to the lower surface of the cap and a second region distal to the lower surface of the cap. The cap flag may be located in any area of the cap. In some cases, the cap flag may be located at or near a periphery of the cap. The cap flag may have any suitable shape. The cap flag may be substantially rectangular or square in shape or may have an irregular shape. In some cases, the cap flag may be substantially cylindrical in shape. In some cases, the cap flag may be substantially flat as opposed to a spherical or cylindrical shape.

The flag screen may include a first region proximal to the top end of the container and second region distal to the top end of the container. The flag screen may be located at or near a periphery of container such that the flag screen is visible from outside. The surface area of the second region of the cap flag may be larger than the surface area of the second region of the flag screen. The surface area of the second region of the cap flag may be substantially same as the surface area of the first region of the flag screen such that when the cap is lowered towards the container but not fully engaged with the container, the second region of the cap flag is covered by the first region of the flag screen and when the cap is fully engaged with container, the second region of the cap flag is behind the second region of the flag screen and is at least partially visible. The cap flag and flag screen may both be substantially flat in shape. The cap flag and flag screen may be substantially flat and substantially rectangular. The cap flag and flag screen may be substantially flat and may have an irregular shape.

The flag screen and the cap flag may be staggered with respect to one another, where they are partially displaced relative to one another instead of being substantially overlapping. The staggered placement results in lack of complete overlap such that the cap flag is visible behind the flag screen when the cap is closed. The container closure indicator system may include a guide member that is positioned to displace the cap flag relative to the flag screen such that at least the second region of the cap flag is pushed behind the first region of the flag screen resulting in an overlap of the two regions such that the cap flag is hidden behind the flag screen when the cap is pushed onto the top end of the container but is not completely closed. The system may further include a space behind the flag screen in which the cap flag is inserted to close the container. The space may be a through-hole. The guide member may be configured to release the lateral displacement of the cap flag once the cap flag is inserted through the space. In some cases, the guide member and the first region of the cap flag are shaped such that once the cap is completely closed, the guide member does not exert pressure on the cap flag. In some cases, the first region of the cap flag may include an indent or a similar structure such that it does not contact the guide member once the cap is closed.

The container may include a flange located at or adjacent the top end and on the outer surface of the container. The flag screen may extend from a lower surface of the flange. The flange may include a through-hole configured for insertion of the cap flag behind the flag screen. The through-hole may include a guide member configured for lateral displacement of the second region of the cap flag with respect to the flag screen when the cap is pressed over the top end of the container. The first region of the cap flag may include a notch that does not contact the guide member thereby terminating the lateral displacement of the cap flag when the cap is fully engaged with the container. The notch may be of any suitable shape. The notch may have rectangular, square, circular, oval, or an irregular shape. The notch may have a shape that fits into the through hole of the flange. In other words, the notch may be sized and shaped to fit around the thickness of the flange such that the cap flag is able to revert to its original staggered position with reference to the flag screen and is visible behind the flag screen.

The guide member and a lower edge (e.g., a corner) of the cap flag may have complementary shapes to increase contact between the guide member and the cap flag when the cap is lowered towards the container and the lower edge of the cap flag is pressed against the guide member. For example, the guide member may have a sloping side configured for contacting the cap flag, where the region of the cap flag that contacts the guide member also has a sloping side having a slope angle substantially complementary to the slope angle of the sloping side of the guide member.

The cap flag may be made from an elastomeric material capable of being flexed upon application of pressure and capable of snapping back into original shape upon removal of the pressure. Examples of elastomeric materials include plastic (e.g., thermoplastic), hardened rubber (synthetic or natural), silicone, etc.

The cap flag and flag screen may have contrasting colors. The contrasting colors may facilitate detection of appearance of the cap flag behind the flag screen. For example, the flag screen may have a light color, such as, white and shades thereof and the cap flag may have a dark color, such as, black and shades thereof.

The system for indicating closure of the container may also include a camera positioned to visualize the second region of the flag screen and to automatically indicate container closure when the cap flag is at least partially visible behind the flag screen. The image obtained by the camera may be analyzed in real time to indicate whether the cap is closed. The means for analyzing the image viewed by the camera may be on-board the camera or an instrument in which the container is placed or may be remote, e.g., on a server. Such means are known in the field of digital image analysis and may include cloud computing.

Additional details of certain embodiments of the system of the present disclosure are now described with reference to certain figures. However, the systems depicted in the figures is exemplary and can be modified based on general knowledge and/or the guidance provided in the present disclosure.

Figure 1B:
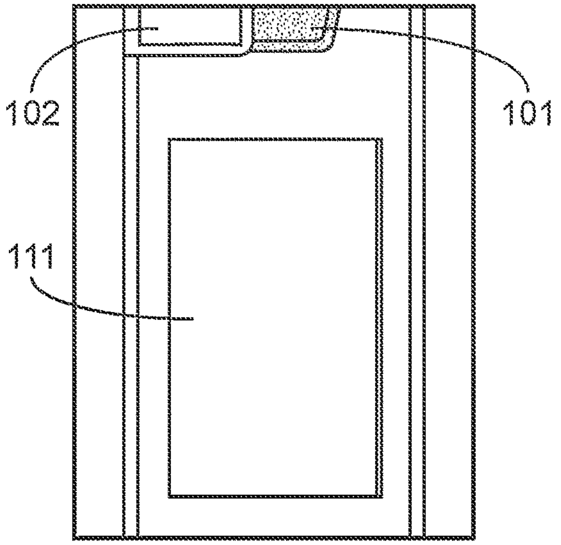
Figure 1C:
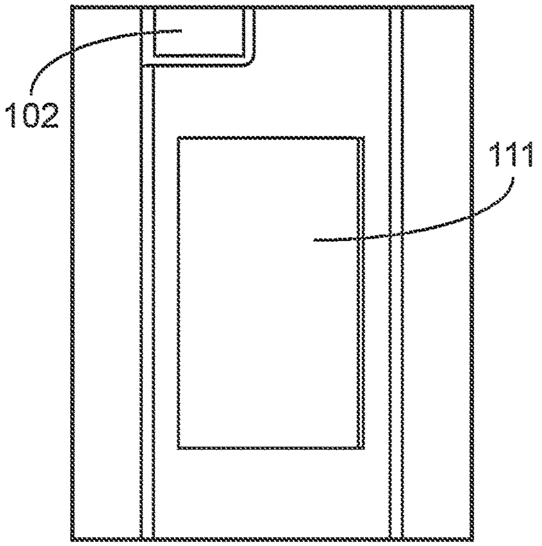
Figure 1D:
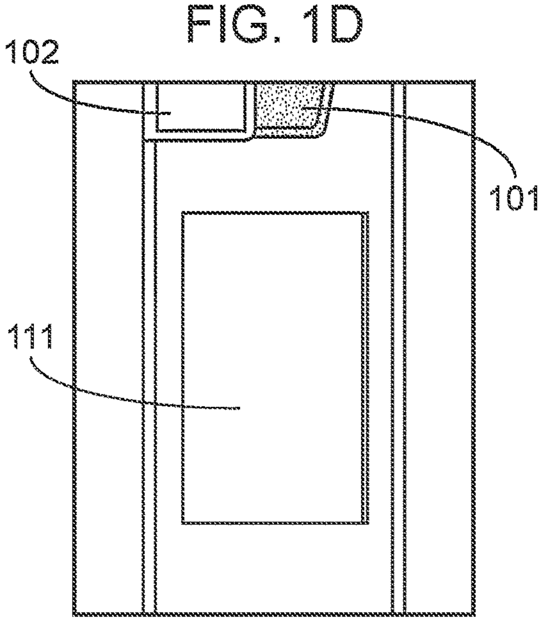

FIGS. 1A-1D depict a container closure indicator system that includes a camera. A front-view of the system as visible to the camera is depicted in FIGS. 1A-1D. In FIGS. 1A and 1C, the lower region of a flag screen 102 is visible to the camera. The cap flag 101 is not visible since the cap is not fully engaged with the container. In FIGS. 1B and 1D, the cap is fully engaged with the container resulting in appearance of the lower region of the cap flag 101 behind the flag screen 102 which is visible to the camera. Also visible is FIGS. 1A-1D is a rectangular area 111 located substantially centrally with reference to the camera's field of view. This rectangular area may be used to house a bar code, a QR code, or the like. The code may be directly printed on the container or it may be printed on a substrate that is affixed to the container. The code may be used to assign a unique identifier to the container. The unique identifier may include information such as, type of container, contents of the container, manufacture date, batch number, item number, and the like. The rectangular area may also serve as a positive control to affirm that the container is properly placed with reference to the camera. For example, if an image (e.g., a code, a bar code, a QR code) present on the rectangular area is detected by the camera and the cap flag is not detected, the system would indicate that the cap is not closed. In certain aspects, the system would instruct the user to close the cap. If the image is not detected by the camera, then the system may instruct the user to align the container or the system may adjust the position of the container to align the container.

A cap flag and a flag screen, such as those depicted in FIGS. 1A-1D, may be included on any type of cap and container, respectively. The cap flag and the flag screen may be located on any exterior region of a container such that the cap flag and the flag screen may be visualized from an exterior location. In some case, the cap flag and the flag screen may be located in a front region or a rear region of a container. In some cases, the system of the present disclosure may be used to indicate closure of a sample preparation device. For example, a sample preparation device may be provided in an open configuration to allow addition of a sample to the sample preparation device. After a sample has been introduced into the sample preparation device, the sample preparation device may be closed. The system of the present disclosure may indicate whether the sample preparation device is completely closed. As noted above, the system may be used by a user to detect that the sample preparation device is completely closed based on visual inspection. The system may be used by an instrument to detect whether the sample preparation device is closed. The system may include a camera that is utilized by the instrument to visualize appearance of the cap flag and thereby detect that the sample preparation device is closed. In some cases, the sample preparation device may be a cylindrical cartridge. In some cases, the cylindrical cartridge may be the cylindrical cartridge described in International Application No. PCT/US2020/066926, filed on Dec. 23, 2020, in any one of U.S. Provisional Application Nos. 63/143,494, 63/143,587, and 63/143,629 filed on Jan. 29, 2021, or in International Application No. PCT/US2022/014422 filed on Jan. 28, 2022. The contents of these applications are herein incorporated by reference.

Figure 2A:
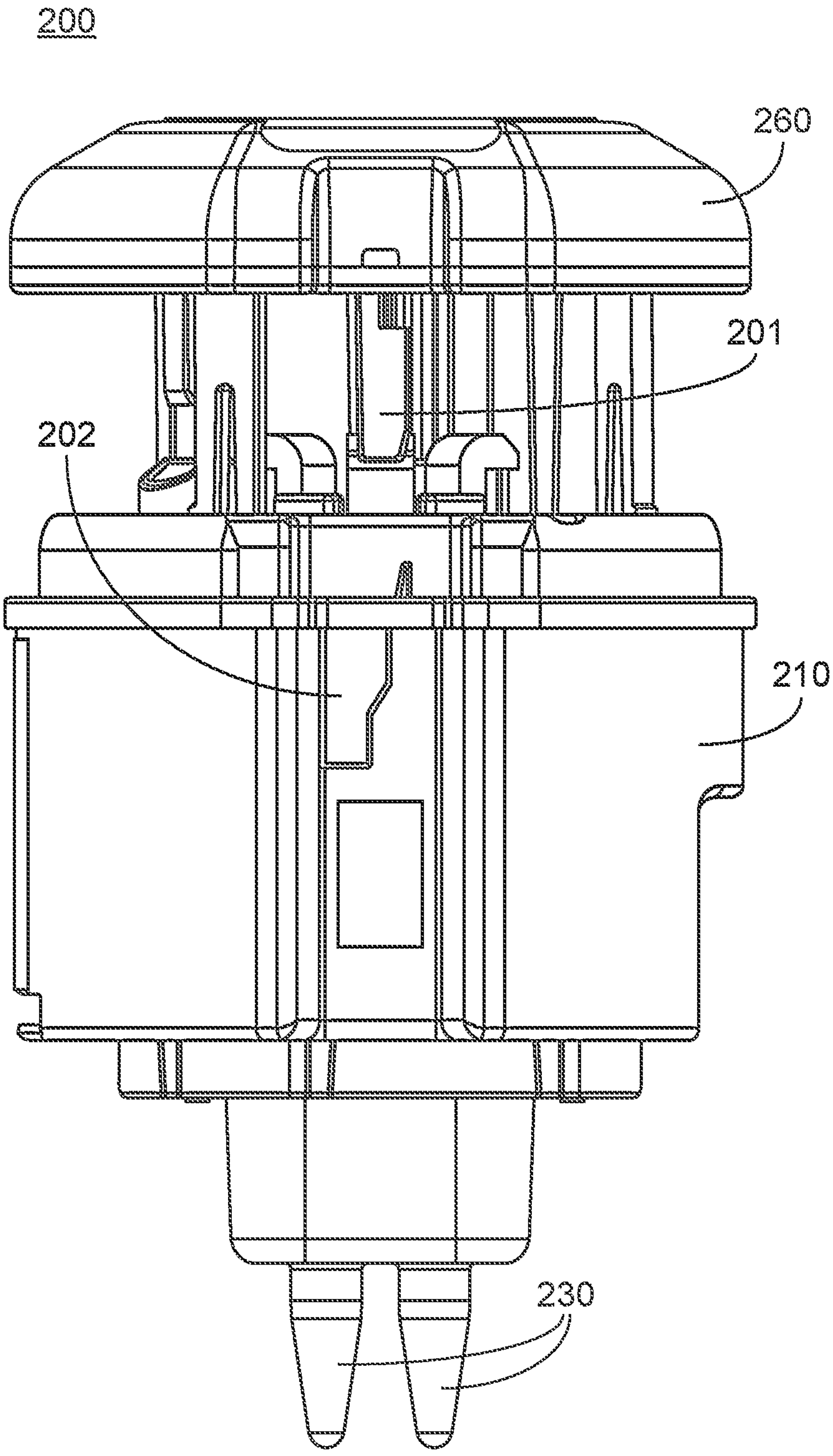
FIGS. 2A-2C depict a cylindrical cartridge that may be used for sample preparation. The cylindrical cartridge includes a container closure system according to one embodiment of the present disclosure. The cylindrical cartridge is shown in an open configuration where the cap is present in a spaced-apart manner from the cylindrical structure of the cartridge.
Figure 2B:
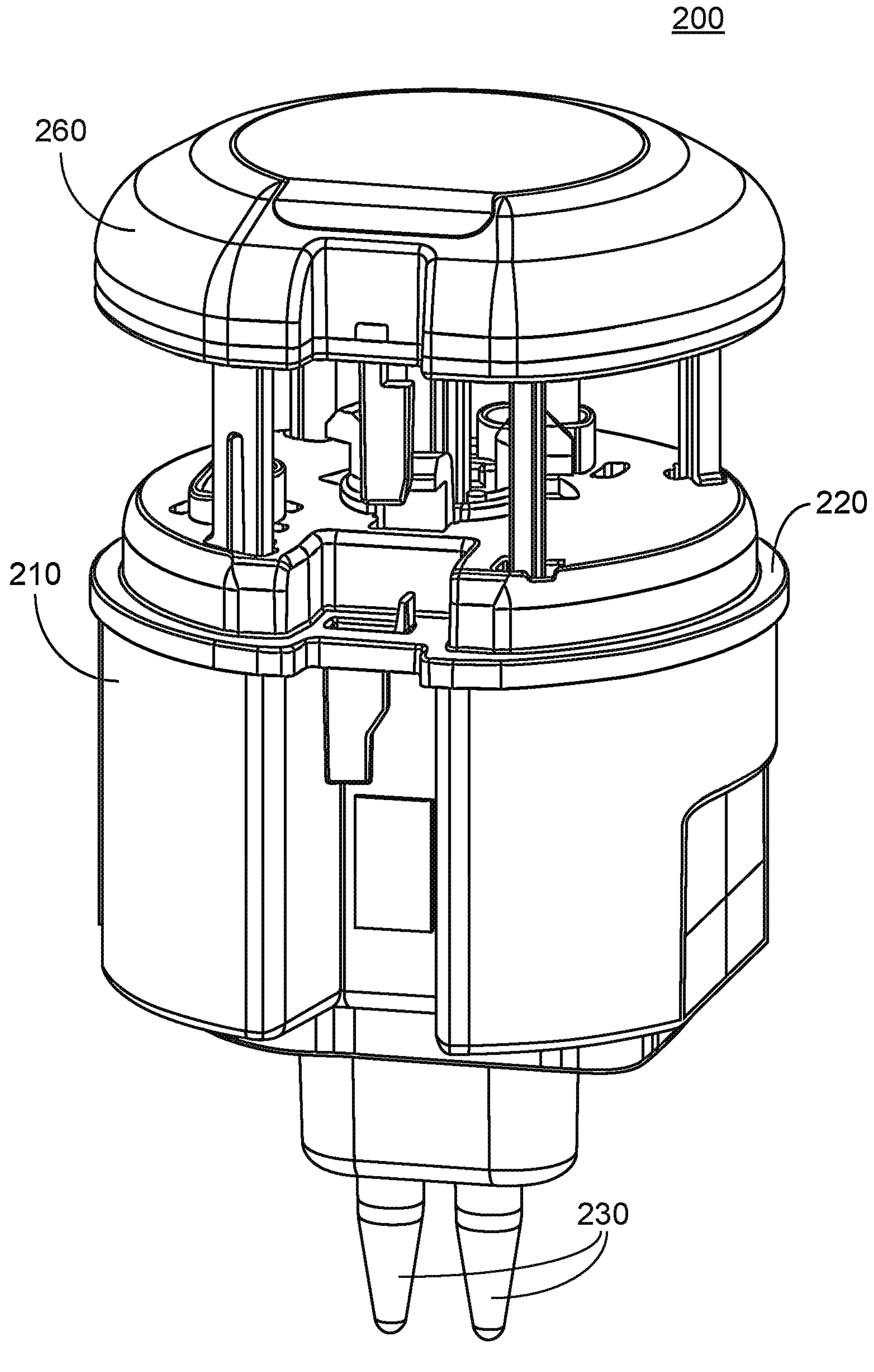
Figure 2C:
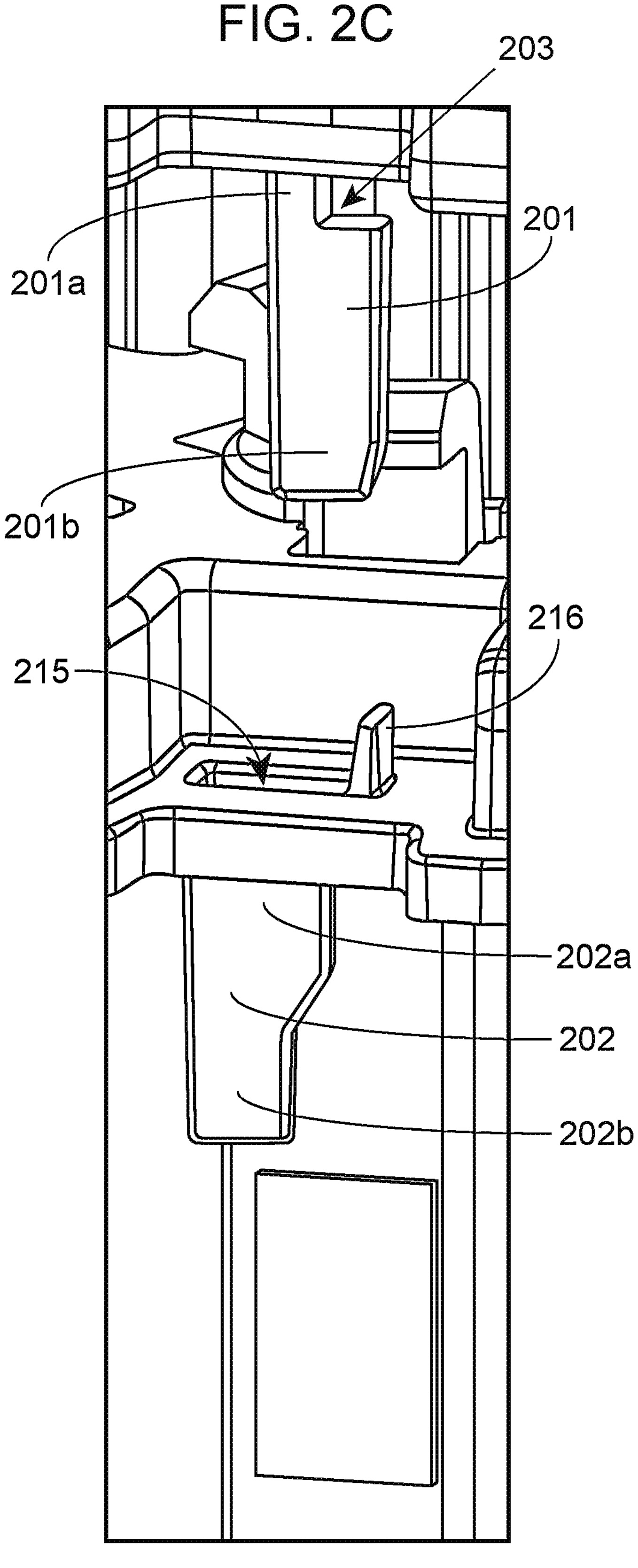

An exemplary cylindrical cartridge that includes a container closure system according to an embodiment of the present disclosure is depicted in FIGS. 2A-2C. The cylindrical cartridge 200 includes a cylindrical structure 210 and a cap 260. The cap 260 includes an upper surface opposite a lower surface. A cap flag 201 is positioned at the lower surface of the cap 260. The cap flag 201 is shown in higher magnification in FIG. 2C. The cap flag 201 includes a first region 201*a* proximal to the lower surface of the cap 260 and a second region 201*b* distal to the lower surface of the cap 260. The flag screen 202 depicted in FIG. 2C includes a first structure 202*a* and a second structure 202*b*, where the first and second structures occlude visualization of the cap flag 201 until the cap is completely closed. In some embodiments, the first and second regions of the cap flag may have substantially the same size. In some embodiments, the first and second regions of the cap flag may have substantially different sizes. In one embodiment, the first region 201*a* has a smaller area as compared to the second region 201*b*. In this example, the first region has a smaller area than the second region since the first includes a notch 203 on a side edge of the first region 201*a*. The side edge in the second region 201*b* engages a guide member 216 located at a through-hole 215 while the side edge in the first region 201*a* does not due to the presence of the notch 203. Also depicted in FIGS. 2A-2C is a flange 220. The through-hole 215 is located in the flange behind the location of the flag screen. The flange 220 extends around the cylindrical structure 210. The width of the flange 220 may be uniform around the circumference of the flange or may vary. For example, the width of the flange 220 is wider at the location where the through-hole 215 is located. In some embodiments, the increased width may be provided by a protrusion in the flange. In some embodiments, the cylindrical structure may include an indentation where an annular wall that extends from the top end to the bottom end of the cylindrical structure is deformed inwards. In some cases, the depth and position of the indentation may be determined based on the location of a camera that would visualize the cap flag and flag screen and/or a bar code, QR code, or another identifier disposed in the indentation.

As depicted in FIGS. 2A and 2B, the cap 260 may include one or more alignment guides that facilitate proper alignment of the cap with the cylindrical structure. For example, the cap may include a centrally located rod-shaped structure that inserts in a hollow shaft located centrally in the cylindrical structure. In some cases, the rod-shaped structure may include a plurality of fingers extending from a distal end of the rod-shaped structure. Protrusions may be located at a distal end of the plurality of fingers. The shaft in the cylindrical structure may have a diameter larger than the diameter of the rod-shaped structure and may include a plurality of indentations in the inner surface complementary to the protrusions such that the cap can be in a spaced apart configuration from the top end of the cylindrical structure when the protrusions of the rod-shaped structure are positioned in the indentations in the shaft. Upon application of downward pressure on the cap, the protrusions disengage from the indentations allowing the rod-shaped structure to slide down the shaft. In FIGS. 2A-2C, the cap is in a spaced-apart configuration with respect to the cylindrical structure and the cylindrical structure is open allowing access to interior of the cylindrical structure.

Figure 3B:
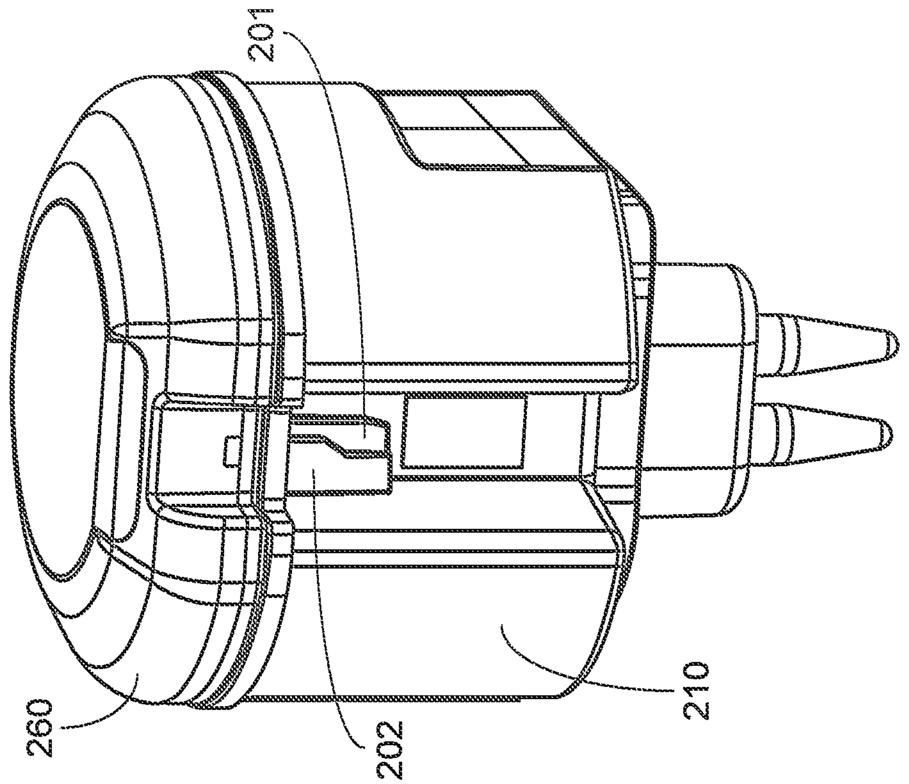
FIGS. 3A-3B show the sample preparation cartridge of FIGS. 2A-2C in which the cap has been closed.
Figure 3A:
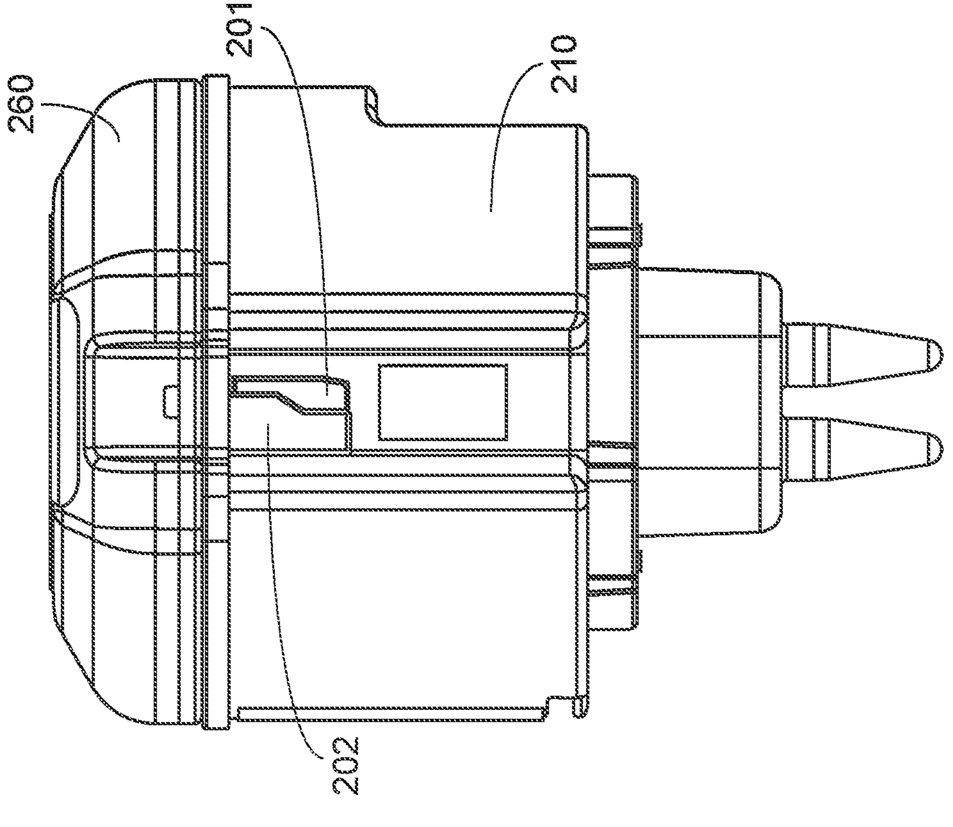

FIGS. 3A and 3B show the location of the cap flag 201 after the cap 260 is fully engaged with the cylindrical structure. For example, the cylindrical structure may include a chamber into which a sample to be prepared by the cylindrical cartridge may be introduced. After introduction of the sample, the cap may be pushed downwards towards the top end of the cylindrical structure. Appearance of at least the second region of the cap flag 201 behind the flag screen 202 indicates that the cap is fully engaged with the cylindrical structure and the sample preparation cartridge is closed and ready to be used for processing the sample. FIG. 3A shows a front-view of the container closure system. In embodiment depicted in FIGS. 3A and 3B, the container closure system is located on a rear region of the cylindrical structure. The cylindrical structure is configured for placement in an instrument, where the rear region of the cylindrical structure faces away from the user and faces towards a rear region of the instrument. In certain embodiments, the rear region of the instrument includes a camera positioned to view the container closure system and record and/or relay information regarding closing of the cylindrical structure to the instrument and/or the user. FIG. 3B shows a side-view offset of the container closure system from front-view.

Figure 4B:
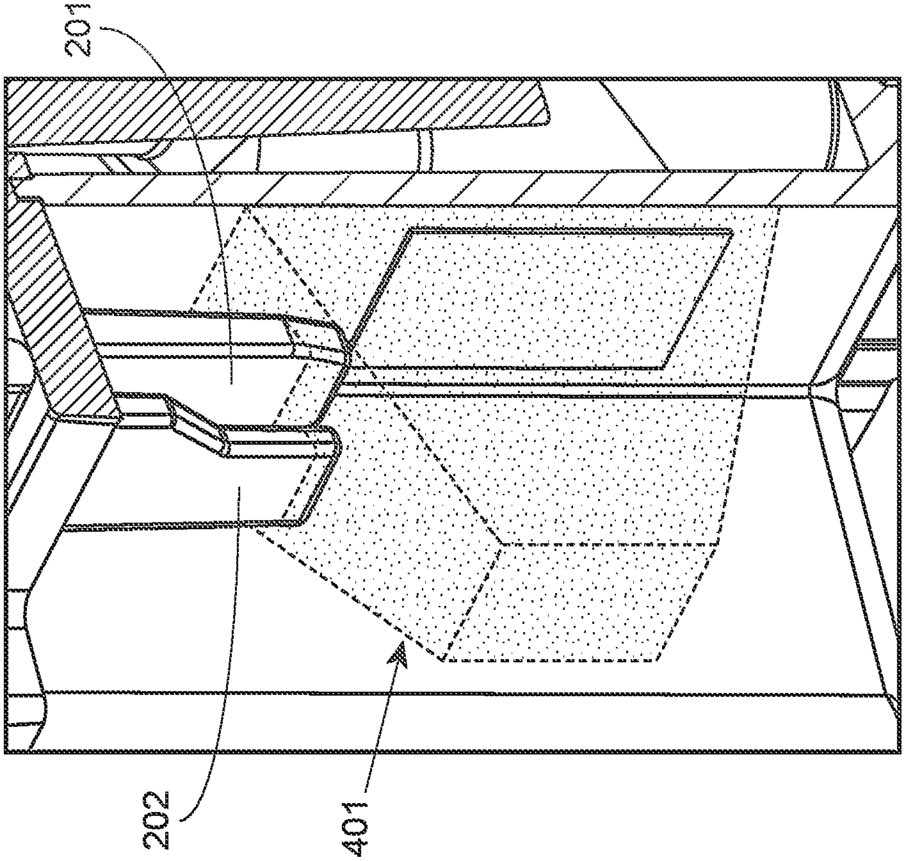
FIGS. 4A-4D show camera-view from a camera for visualizing a container closure system.
Figure 4A:
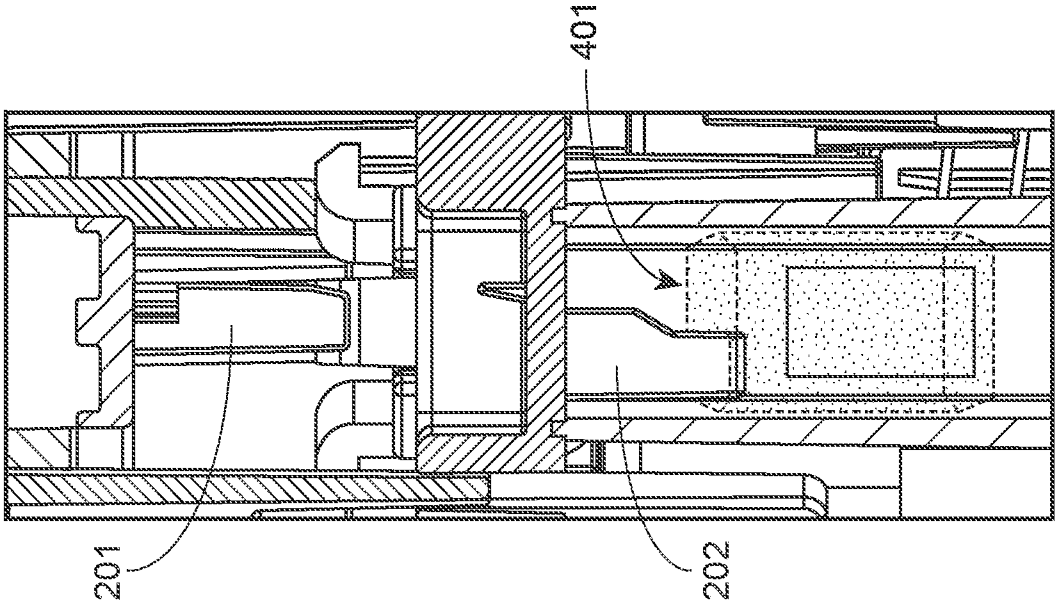
Figure 4D:
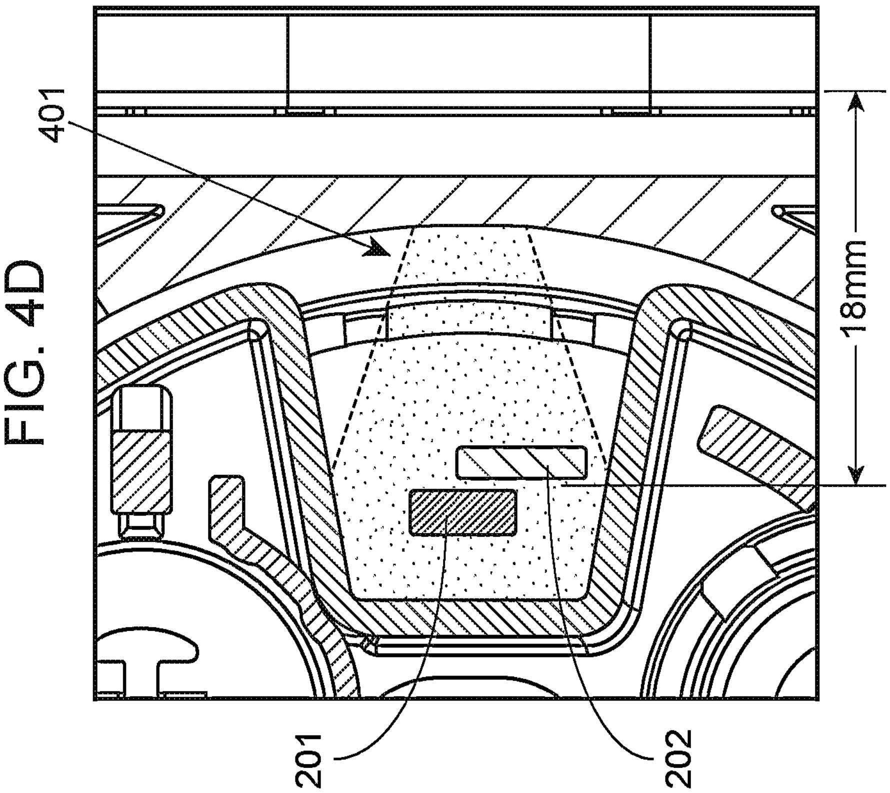
Figure 4C:
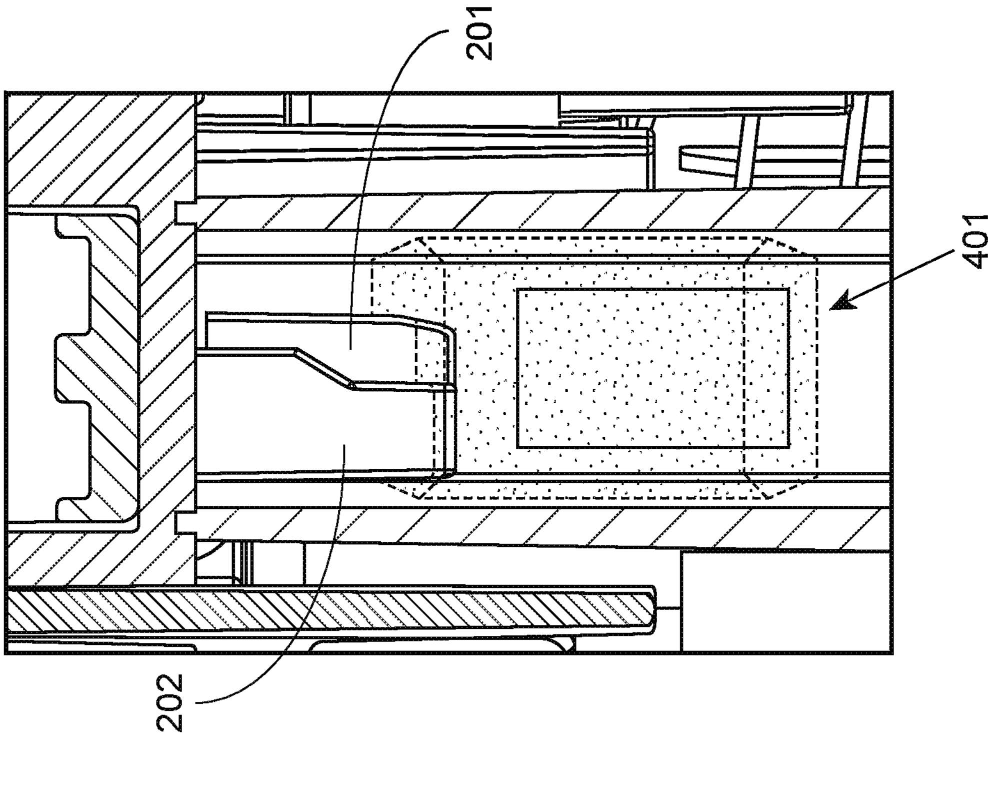

Further details of a container closure indicator system that includes a camera for detecting appearance of the cap flag behind the flag screen are shown in FIGS. 4A-4D. Shaded area 401 depicts field of view of the camera used in the system for detecting complete closure of the container. In FIG. 4A, only the second region of the flag screen in present within the camera's field of view. FIGS. 4B and 4C show the system after the cap is closed. Both the second regions of the cap flag 201 and flag screen 202 are present within the camera's field of view. A top view of the system is shown in FIG. 4D. The location of the cap flag 201 is staggered with reference to the flag screen. In this particular example, the distance between the camera and the mid-way point between the flag screen and cap flag is about 18 mm.

Figure 5B:
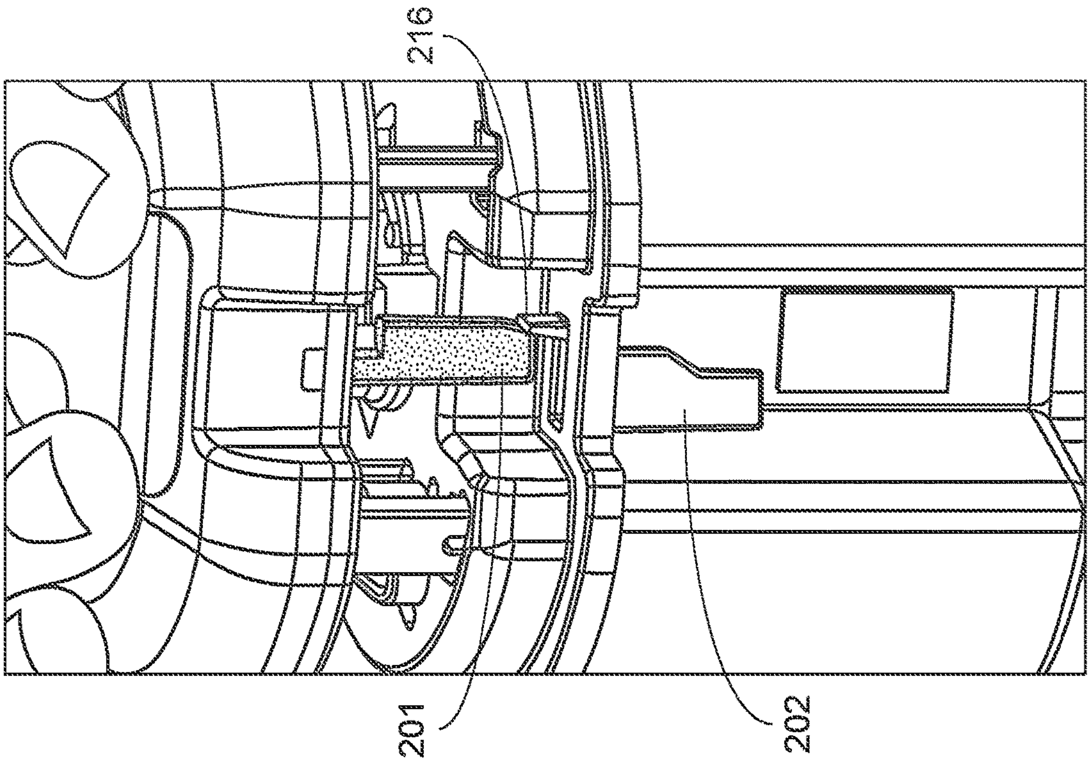
FIGS. 5A-5E show a user closing a cap onto the top end of a sample preparation cartridge.
Figure 5A:
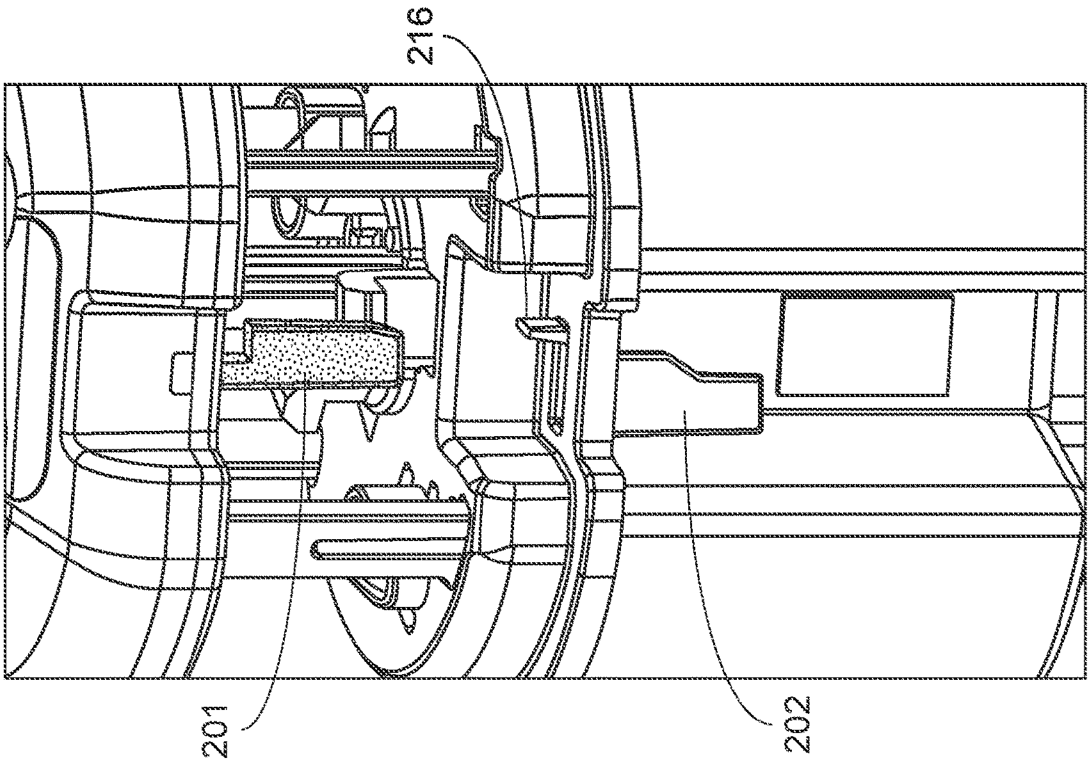
Figure 5D:
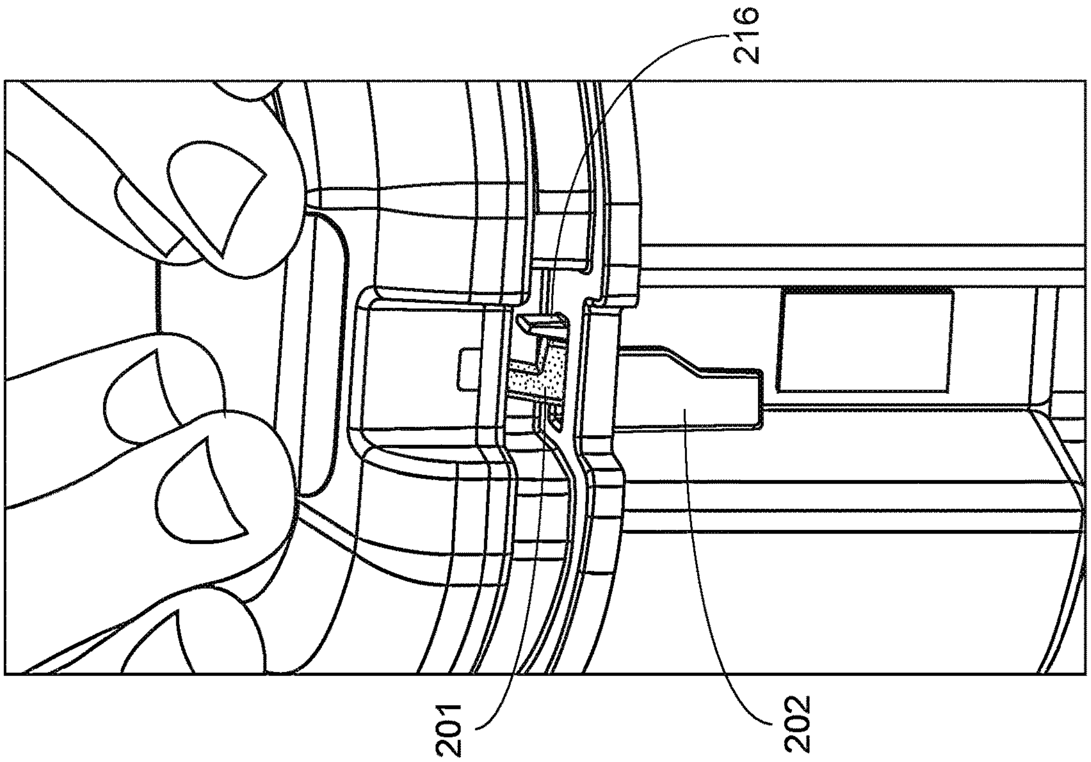
Figure 5C:
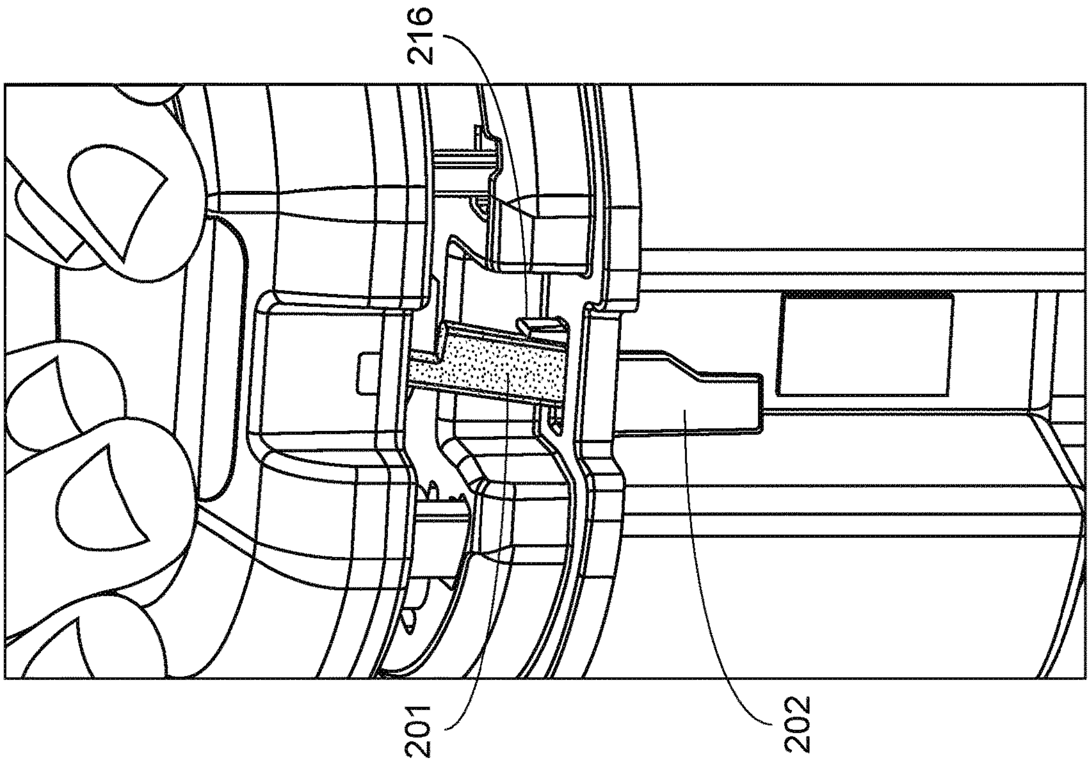
Figure 5E:
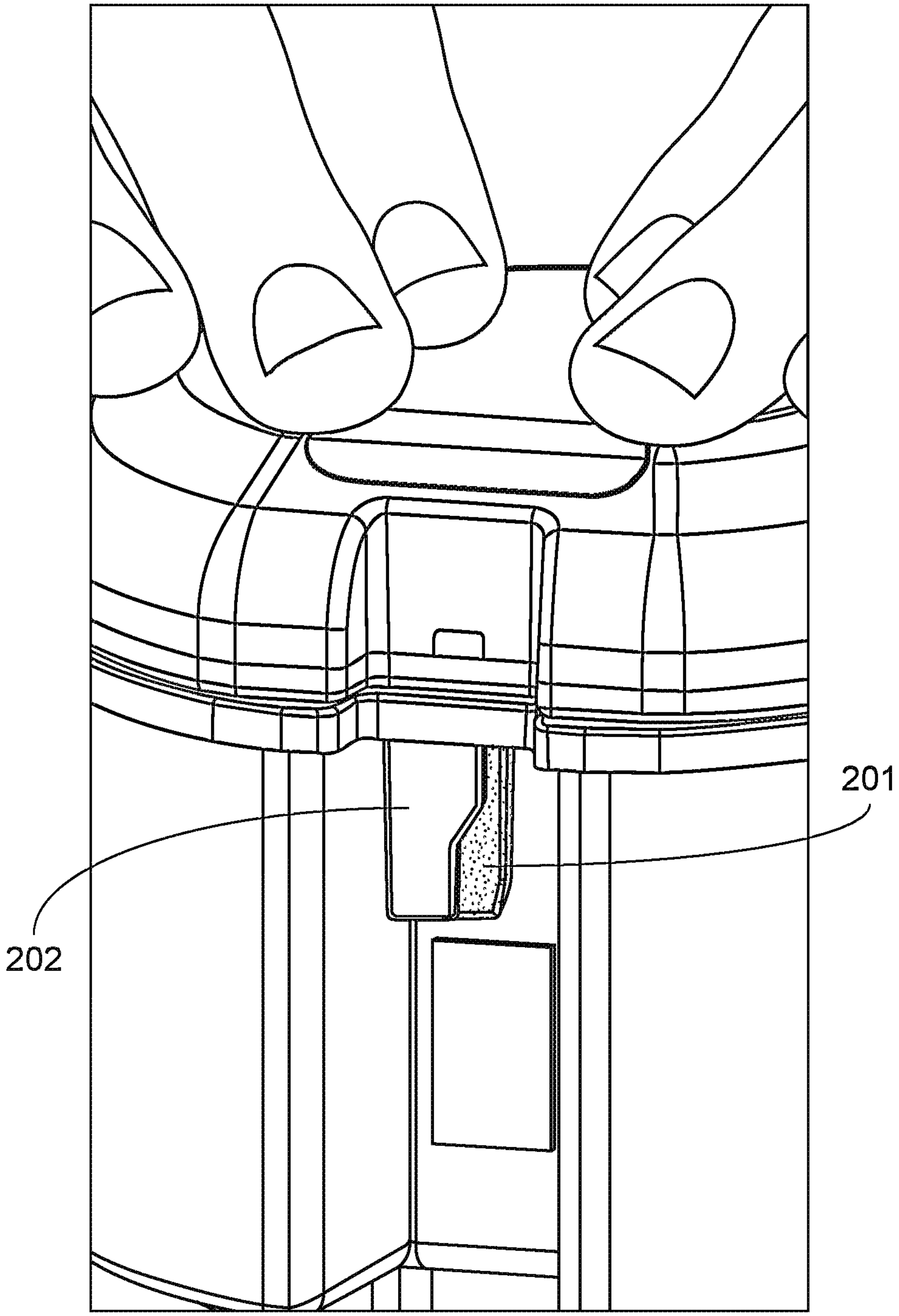

FIG. 5A shows the relative position of the cap flag 201 and flag screen 202 when the cap is in an open position. The staggered positioning of the flag screen and cap flag is also visible. Due to the staggered positioning if the cap flag was to be pushed into a position behind the flag screen, it would be visible behind the flag screen even if the cap was not completely closed. FIG. 5B shows application of downwards force on the cap presses a corner of the lower edge of the cap flag against the guide member displacing the cap flag laterally such that the second region of the cap flag 201 overlaps with the first region of the flag screen and is not visible behind the flag screen when the container is partially closed (FIGS. 5C and 5D). Once the container is completely closed, the pressure on the cap flag applied by the guide member 216 is removed resulting in the cap flag moving to its original staggered position with reference to the flag screen.

Figure 6A:
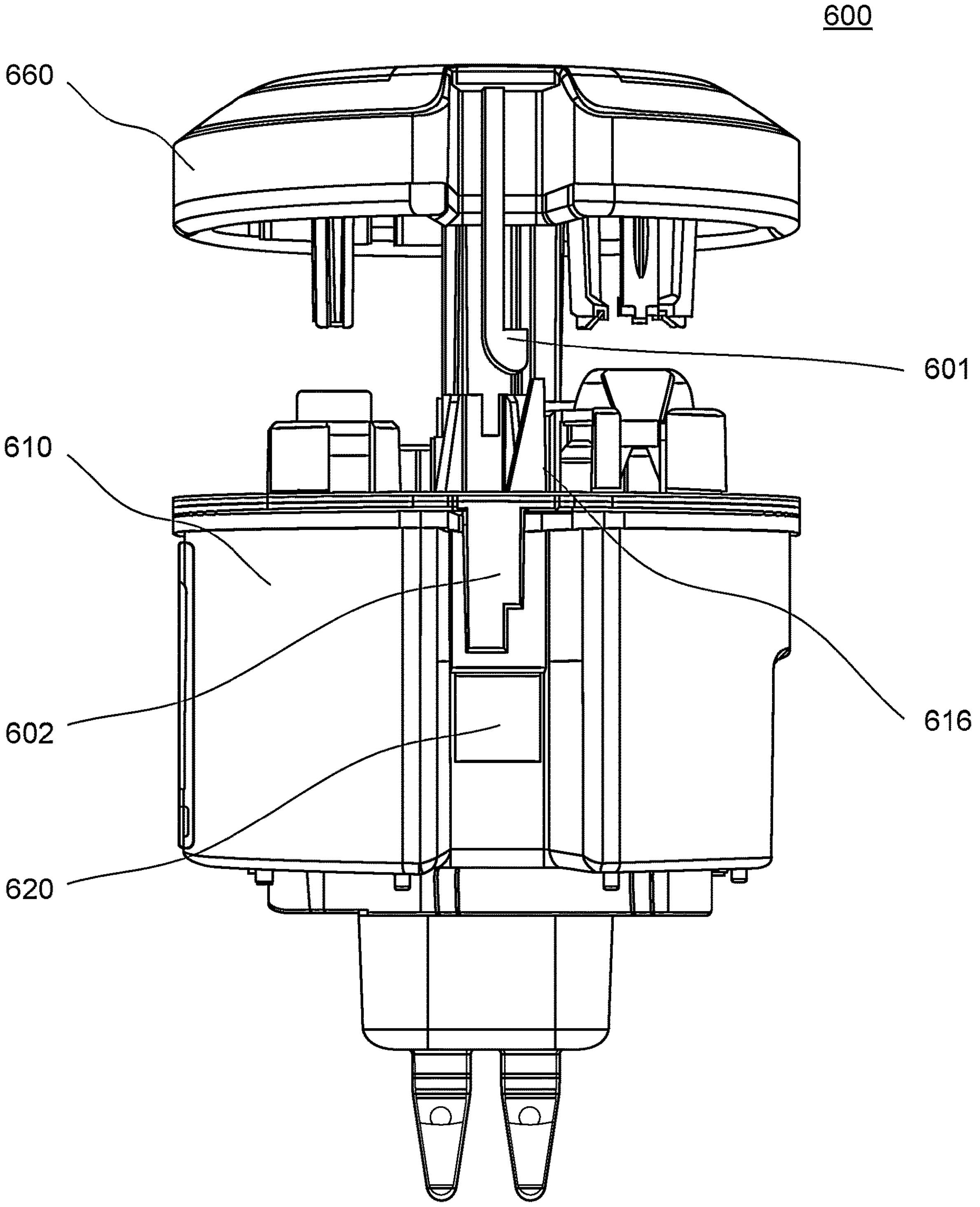
FIGS. 6A-6D show a cylindrical cartridge comprising a cap with a cap flag and a cylindrical structure with a flag screen.
Figure 6B:
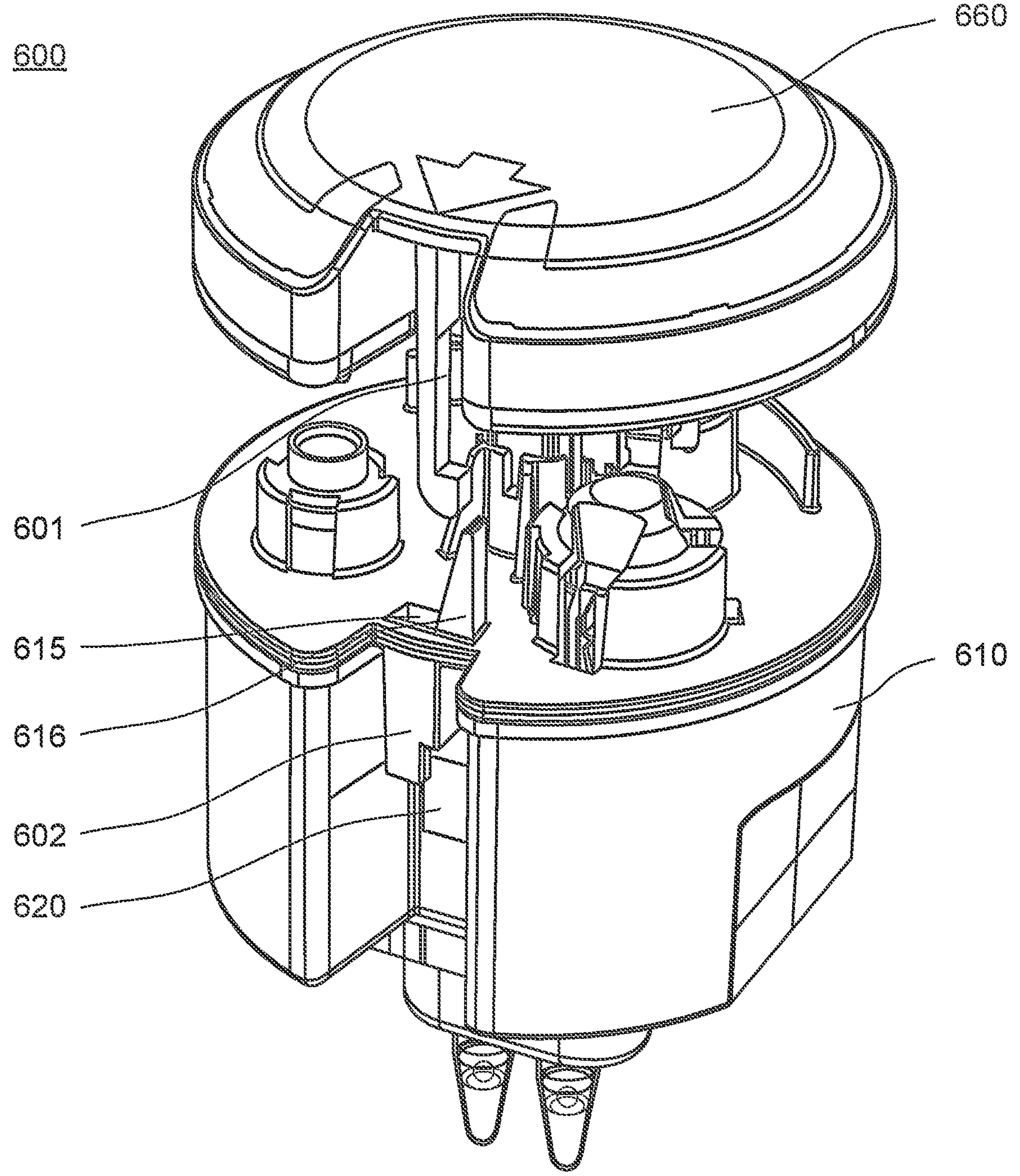
Figure 6D:
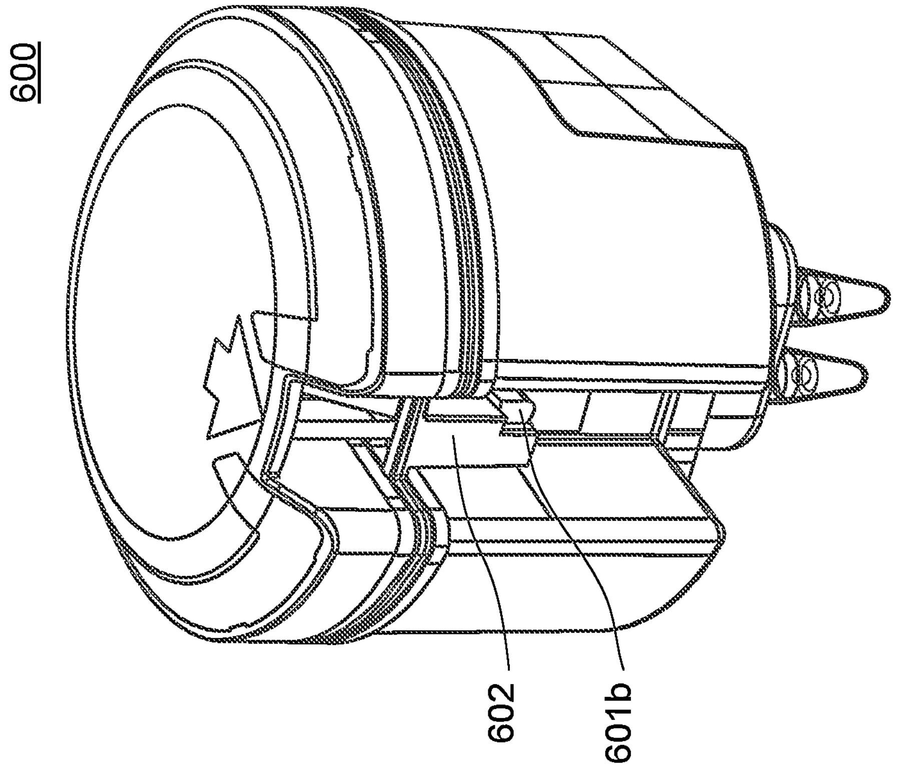
Figure 6C:
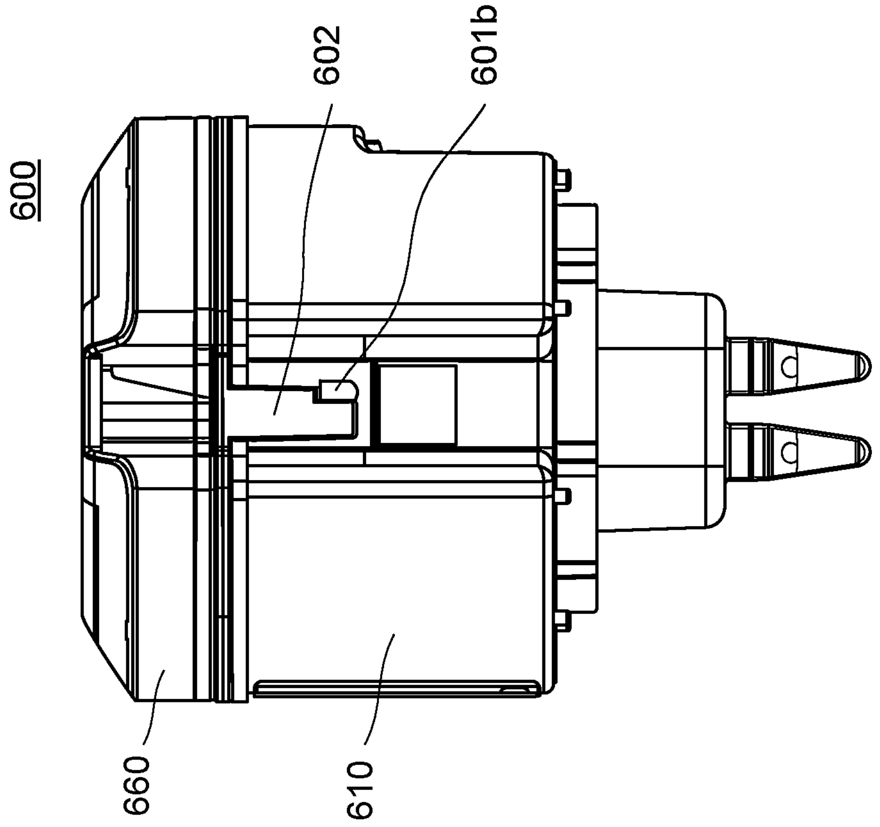
Figure 6E:
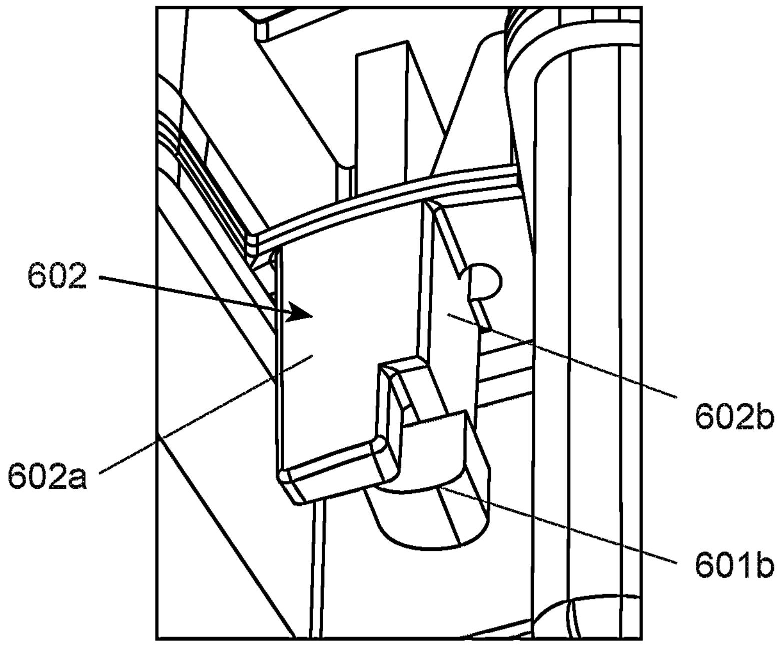
FIGS. 6E and 6F show a detailed view of the cap flag and flag screen shown in FIGS. 6A-6D.
Figure 6F:
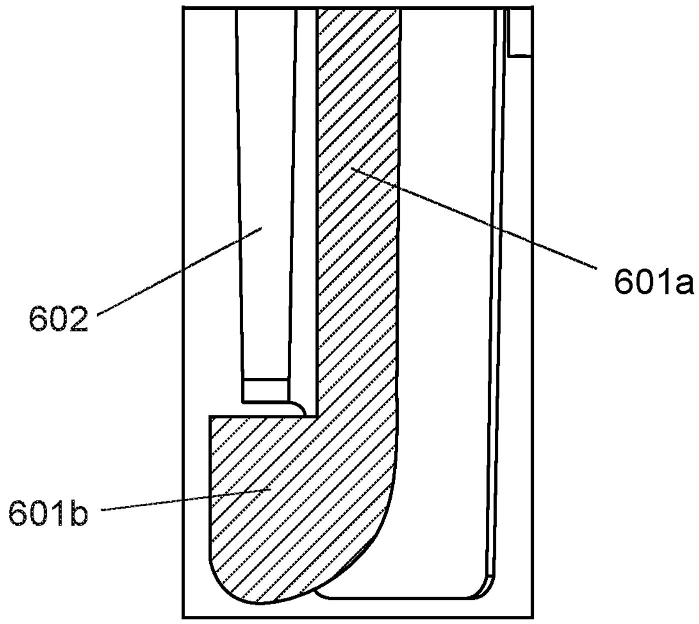

An exemplary cylindrical cartridge that includes a container closure system according to an embodiment of the present disclosure is depicted in FIGS. 6A-6F. The cylindrical cartridge 600 includes a cylindrical structure 610 and a cap 660. The cap 660 includes an upper surface opposite a lower surface. A cap flag 601 is positioned at the lower surface of the cap 660. The cap flag 601 is shown in higher magnification in FIGS. 6E and 6F. The cap flag 601 includes a first region 601 a proximal to the lower surface of the cap 660 and a second region 601*b* distal to the lower surface of the cap 660. In some embodiments, the first and second regions of the cap flag may have substantially the same size. In some embodiments, the first and second regions of the cap flag may have substantially different sizes. In one embodiment, the first region 601*a* has a smaller width as compared to the second region 601*b*. In this example, the first region has a smaller width than the second region due to presence of a cut-out on a side edge of the first region 601*a*. The side edge in the second region 601*b* engages a guide member 616 located immediately adjacent a through-hole 615 while the side edge in the first region 601*a* does not engage the guide member 616 due to the presence of the cut-out. In some embodiments, the cylindrical structure may include an indentation where an annular wall that extends from the top end to the bottom end of the cylindrical structure is deformed inwards. In some cases, the depth and position of the indentation may be determined based on the location of a camera that would visualize the cap flag and flag screen and/or a positive control mark, such as, a bar code, QR code, or another identifier disposed in the indentation. The flag screen 602 is located within the indentation and extends downwards from a top region of the cylindrical cartridge. The flag screen 602 is located immediately adjacent and in front of the through-hole 615 in which the cap flag 601 is inserted. The flag screen 602 depicted in FIGS. 6A-6E includes a first structure 602*a* and a second structure 602*b* where the first and second structures occlude visualization of the cap flag until the cap is completely closed. The first structure 602*a* is positioned in front of the cap flag and prevents visualization of the cap flag from a position substantially in front of the cap flag until the cap flag is completely inserted when the cap is completely closed. The second structure 602*b* is positioned on a side of the cap flag and prevents visualization of the cap flag from a side view until the cap flag is completely inserted when the cap is completely closed. The front view may be at an angle of about 90 degree between a plane of the first structure 602*a* and line of sight located substantially in front of the flag screen. The side view may be at an angle between 90 degree and 180 degree, e.g., between 90 degree and 160 degree, 140 degree, 120 degree, 110 degree, 105 degree, 100 degree, 95 degree, or less. FIG. 6E depicts a side view of the cap flag and flag screen. FIG. 6F depicts a view from an angle of about 180 degree, e.g., from a plane substantially parallel to the plane of the first structure 602*a*. In certain embodiments, the length of the second structure 602*b* matches the length of the first structure on the side of the first structure 602*a* that includes a notch that allows the lower region 601*b* of the cap flag 601 to be visible upon complete insertion of the cap flag 601. In certain embodiments, the first and second structures 602*a* and 602*b* of the flag screen 602 are substantially planar and perpendicular to each other.

FIGS. 6C-6F show the location of the cap flag 601 after the cap 660 is fully engaged with the cylindrical structure. For example, the cylindrical structure may include a chamber into which a sample to be prepared in the cylindrical cartridge may be introduced. After introduction of the sample, the cap may be pushed downwards towards the top end of the cylindrical structure. Appearance of at least the second region 601*b* of the cap flag 601 behind the flag screen 602 indicates that the cap is fully engaged with the cylindrical structure and the sample preparation cartridge is closed and ready to be used for processing the sample. FIG. 6C shows a view of the container closure system from a point in front of the container closure system. In embodiment depicted in FIGS. 6A-6F, the container closure system is located on a rear region of the cylindrical structure, the rear region being in the back region of an instrument in which the cylindrical structure is placed. The cylindrical structure is configured for placement in an instrument, where the rear region of the cylindrical structure faces away from the user and faces towards a rear region of the instrument. In certain embodiments, the rear region of the instrument includes a camera positioned to view the container closure system and record and/or relay information regarding closing of the cylindrical structure to the instrument and/or the user. FIG. 6D shows a side-view of the container closure system offset from front-view.

Figure 7:
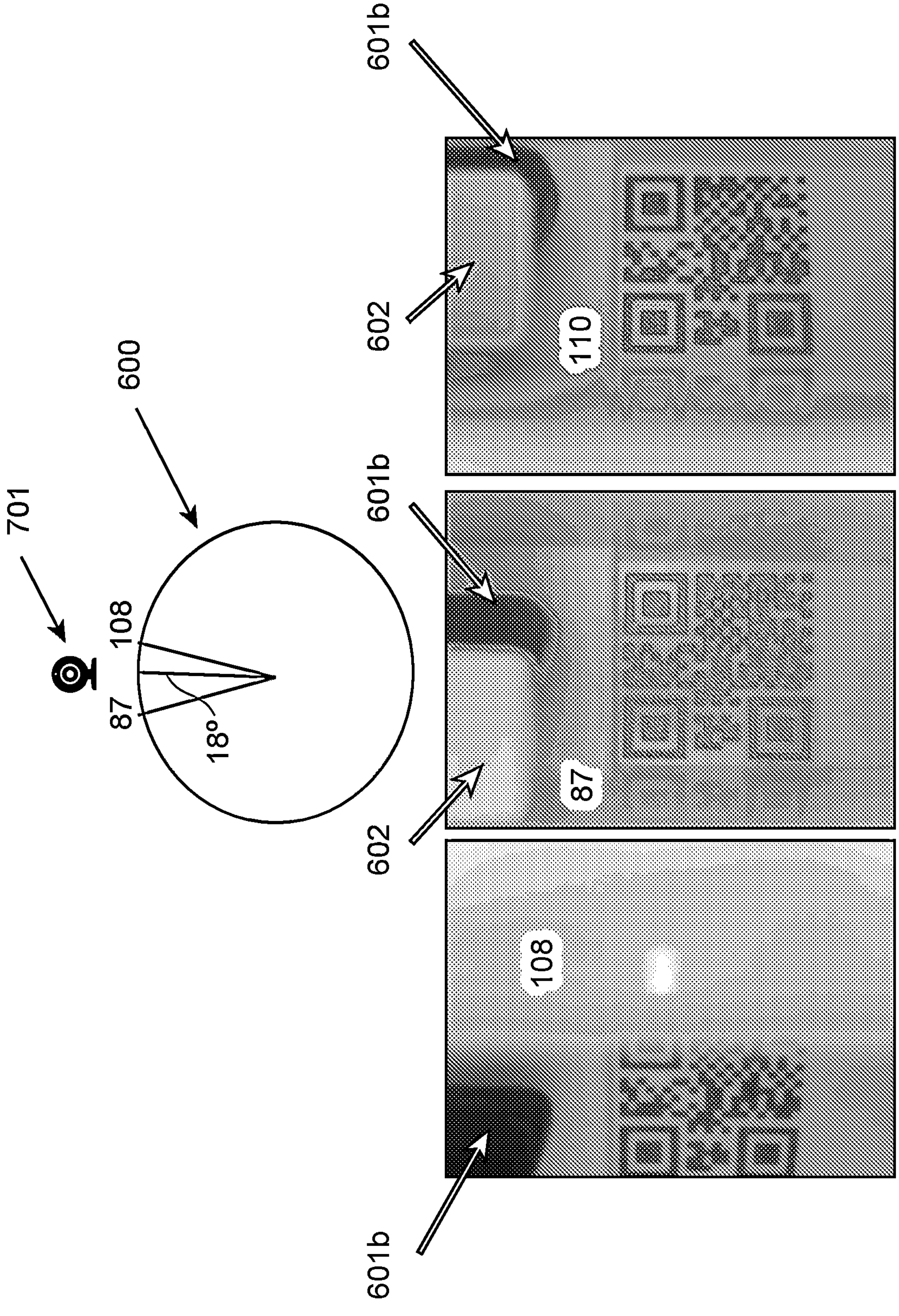
FIG. 7 shows a schematic of relative placement of a container comprising a container closure system and a camera for visualizing the container closure system. A QR-code serves as a positive control for indicating proper alignment between the camera and the container.

FIG. 7 provides a schematic of a camera 701 positioned at a point in front of the container closure system of a cylindrical container. "100" indicates a relative angle between the camera's field of view and a plane of the rectangular region 620 positioned below the flag screen and cap flag, where the angle is about 90 degree. In this embodiment, a QR code positioned on the rectangular region 620 is in focus and the entire QR code is within the field of view of the camera. In certain embodiments, the cylindrical container may be offset from the field of view of the camera such that the camera is viewing the rectangular region from a side, e.g., from a right or left side of the cylindrical container. For example, a view from substantially in front of the flag screen would be an angle of 90 degree, as measured between a direct line of view from the camera and a plane of the flag screen. This position is also referred to as motor position 100 Unit with the QR code facing the camera, where 360 degrees=400 position units. A view from a right side of the flag screen would be a view at an angle greater than 90 degree. A view from a left side of the flag screen would be a view at an angle smaller than 90 degree. As shown in FIG. 7, "108" refers to a view of the cylindrical container from the right side of the flag screen at a 108 position unit or an angle of about 97 degree. In this view, the QR code and the lower region 601*b* of the cap flag exposed by the presence of a notch in the lower region of the flag screen 602 are visible. Unit position "87" or an angle of about 80 degree also enable visualization of the QR code and the lower region 601*b* of the cap flag exposed by the presence of a notch in the lower region of the flag screen 602.

By cylindrical, it is meant that the cylindrical structure may be substantially a right circular cylinder. The annular wall may be deformed inward from the outside to form an inwardly deformed cavity in the annular wall. The annular wall may additionally include chambers for processing a sample, such as, a chamber in which a sample and a lysis solution is disposed, a chamber in which air or wash solution is present, a chamber in which an analyte isolated from the sample is eluted. In embodiments where the cap irreversibly closes the container, such as a sample preparation cartridge described herein, the cartridge may include a detachable analyte collection container(s) fluidically connected to the chamber in which the analyte is eluted. Exemplary detachable analyte collection containers 230 are depicted in FIGS. 2A-2B.

Methods for Indicating Complete Closing of Container

In certain aspects, methods for detecting and indicating complete closing of a container using the container closure system provided herein are described. In certain embodiments, the method may be implemented using a computer. In certain embodiments, the method may be implemented by a processor configured to instruct a machine to perform the method steps described herein. In certain embodiments, the processor may include instructions, e.g., computer program, for performing the method steps provided herein.

In certain embodiments, the method for detecting and indicating complete closing of a container by a cap may include visualizing an area of the container with a camera, wherein the area comprises a container closure system comprising a cap flag and an flag screen, wherein the cap flag is configured for insertion behind the flag screen and the flag screen is configured to occlude visibility of the cap flag till the cap is fully engaged with the container, thereby closing the container, wherein appearance of the cap flag behind the flag screen indicates that the container is closed by the cap.

In certain embodiments, when the cap flag is not visible behind the flag screen, the method comprises prompting a user to completely close the cap. The step of prompting the user may include a visual prompt and/or and audible prompt. In certain embodiments, the method may include displaying on a display of a machine in which the container is placed, a message indicating that the container needs to be closed completely.

In certain embodiments, the area comprising the container closure system further comprises a positive control mark. The positive control mark can serve as an indicator of proper alignment between the camera and the container. The positive control mark can be any indicia that can be detected by the camera and may include a 2-dimensional mark, e.g., a bar code or a QR code. In certain embodiments, the method comprises visualizing the positive control mark, wherein when the positive control mark is detected, the container is properly placed with reference to the camera and wherein when the positive control mark is not visible, the method comprising prompting the user to align the area to the camera.

In certain embodiments, the method includes promoting the user visually or audibly to align the container with respect to the camera. In certain embodiments, the method includes promoting the user to rotate the container clockwise or anti-clockwise to align it with the camera. In certain embodiments, the visual prompt may be displayed on a display of an instrument in which the container is placed.

In certain embodiments, the container closure system is as described in the preceding section.

In certain embodiments, the visualizing comprises capturing an image of the area and processing the image. The image may be processed using an on-board algorithm or using cloud-computing. In certain embodiments, the visualizing comprises capturing an image of the area and processing the image to identify presence of substantially the entire positive control mark prior to processing the image to determine presence of the cap flag behind the flag screen.

In certain embodiments, the method may include (a) capturing an image of the area and (b) detecting the positive control mark. If the positive control mark is not detected, prompting the user to align the container in the instrument and repeating steps (a) and (b). If the positive control mark is detected, then (c) detecting the presence of the lower region of the cap flag. If the lower region of the cap flag is not detected, promoting the user to close the cap. If the lower region of the cap flag is detected, then (d) initiating processing of a sample present in the container.

As used herein, the term "processor" refers to one or more devices, circuits, and/or processing cores configured to process data, such as computer program instructions.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A container closure indicator system comprising:

a cap flag and a flag screen, wherein the cap flag is located on a lower surface of a cap and extends downwards away from the lower surface and the flag screen is located on an outer surface of a container and adjacent a top end of the container and extends towards a bottom end of the container, and wherein the cap flag is configured for insertion behind the flag screen which is configured to occlude visibility of the cap flag till the cap is fully engaged with the container, wherein appearance of the cap flag behind the flag screen indicates that the container is closed by the cap, wherein the cap flag comprises a first region proximal to the lower surface of the cap and a second region distal to the lower surface of the cap, wherein the flag screen comprises a first region proximal to the top end and second region distal to the top end of the container, wherein a width of the second region of the cap flag is larger than a width of the second region of the flag screen and wherein the width of the second region of the cap flag is substantially same as the width of the first region of the flag screen such that when the cap is lowered towards the container but not fully engaged with the container, the second region of the cap flag is covered by the first region of the flag screen and when the cap is fully engaged with container, the second region of the cap flag is behind the second region of the flag screen and is at least partially visible.

2. The system of claim 1, wherein the container comprises a flange located at or adjacent the top end and on the outer surface of the container, wherein the flange comprises the flag screen extending from a lower surface thereof.

3. The system of claim 2, wherein the flange comprises a through-hole configured for insertion of the cap flag behind the flag screen, the through-hole being in vertical alignment with the cap flag such that upon lowering of the cap towards the top end of the container, the cap flag enters the through-hole and wherein the through-hole is positioned behind the location of the flag screen.

4. The system of claim 3, wherein the through-hole is offset relative to the location of the flag screen.

5. The system of claim 4, wherein the flag screen comprises a rectangular first region and a rectangular second region, wherein a width of the first region is larger than the width of the second region and wherein one side edge of the flag screen slopes inwards from the first region towards the second region.

6. The system of claim 3, wherein the through-hole comprises a guide member configured for lateral displacement of the second region of the cap flag with respect to the first region of the cap flag such that the second region is located completely behind the flag screen when the cap is less than completely closed and wherein the first region of the cap flag comprises a notch that does not contact the guide member thereby terminating the lateral displacement of the cap flag when the cap is fully engaged with the container such that the second region of the cap flag is offset from the second region of flag screen and is visible behind the second region of the flag screen.

7. The system of claim 6, wherein the guide member and a lower edge of the cap flag have complementary shapes to increase contact between the guide member and the cap flag when the cap is lowered towards the container.

8. The system of claim 1, wherein the cap flag comprises a rectangular first region and a rectangular second region, wherein:

i) a width of the first region is smaller than the width of the second region and wherein one side edge of the cap flag slopes outwards from the first region towards the second region, or ii) a width of the first region is smaller than the width of the second region and wherein one side edge of the cap flag includes a notch in the first region.

9. The system of claim 8, wherein the width of the first region is smaller than the width of the second region and wherein one side edge of the cap flag includes the notch in the first region, and wherein the length of notch is longer than a thickness of the flange on which the through-hole is located.

10. A method for detecting closure of a container with a cap, the container comprising the container closure indicator system of claim 1, the method comprising:

visualizing an area of the container with a camera, wherein the area comprises the container closure indicator system comprising a cap flag and an flag screen, wherein the cap flag is configured for insertion behind the flag screen which is configured to occlude visibility of the cap flag till the cap is fully engaged with the container, thereby closing the container, wherein appearance of the cap flag behind the flag screen indicates that the container is closed by the cap.

11. The method of claim 10, wherein when the cap flag is not visible behind the flag screen, the method comprises prompting a user to completely close the cap.

12. The method of claim 10, wherein the area further comprises a positive control mark, wherein the method comprises visualizing the positive control mark, wherein when the positive control mark is detected, the container is properly placed with reference to the camera and wherein when the positive control mark is not visible, the method comprising prompting the user to align the area to the camera.

13. The method of claim 12, wherein the container comprises a flange located at or adjacent the top end and on the outer surface of the container, wherein the flange comprises the flag screen extending from a lower surface thereof.

14. The method of claim 13, wherein the flange comprises a through-hole configured for insertion of the cap flag behind the flag screen, the through-hole being in vertical alignment with the cap flag such that upon lowering of the cap towards the top end of the container, the cap flag enters the through-hole and wherein the through-hole is positioned behind the location of the flag screen.

15. The method of claim 14, wherein the through-hole comprises a guide member configured for lateral displacement of the second region of the cap flag with respect to the first region of the cap flag such that the second region is located completely behind the flag screen when the cap is less than completely closed and wherein the first region of the cap flag comprises a notch that does not contact the guide member thereby terminating the lateral displacement of the cap flag when the cap is fully engaged with the container such that the second region of the cap flag is offset from the second region of flag screen and is visible behind the second region of the flag screen.

16. The method of claim 15, wherein the guide member and a lower edge of the cap flag have complementary shapes to increase contact between the guide member and the cap flag when the cap is lowered towards the container.

17. The method of claim 10, wherein the visualizing comprises capturing an image of the area and processing the image to identify presence of substantially the entire positive control mark prior to processing the image to determine presence of the cap flag behind the flag screen.

* * * * *